3,388,128
SUBSTITUTED 1,4-DIAZABICYCLO[4.4.0]DECANES
Allan R. Day, 503 N. Wynnewood Road, Narberth, Pa. 19072, and Alan D. Lourie, 1549 Willowbrook Lane, Villanova, Pa. 19085
No Drawing. Filed Sept. 3, 1965, Ser. No. 485,125
10 Claims. (Cl. 260—268)

ABSTRACT OF THE DISCLOSURE 9-methyl and 9-hydroxymethyldiazabicyclo[4.4.0]decanes substituted at the 4-position are prepared by a series of reactions from 6-methylpicolinic acid and pyridine-2,6-dicarboxylic acid, respectively. The compounds possess hypotensive, antihistaminic, and anticholinergic activity.

---

This invention relates to chemical compounds having pharmacological activity. In particular, the invention relates to 1,4-diazabicyclo[4.4.0]decanes substituted at the 4 and 9-positions thereof, having hypotensive, antihistaminic, and anticholinergic activity.

The compounds of the invention may be represented by means of the following structural formula:

I wherein:
R is hydrogen or hydroxy; and
$R^1$ is hydrogen, benzyl, benzhydryl, amino lower alkyl, dilower alkylamino lower alkyl, piperidino lower alkyl, pyrrolidino lower alkyl, 4-methylpiperazino lower alkyl, morpholino lower alkyl, hexamethylenimino lower alkyl, guanidino lower alkyl, or guanyl.

For purposes of the present invention, the term "lower alkyl" is intended to represent those alkyl groups having up to about five carbon atoms therein.

The compounds of the invention are prepared in the following manner, reference being made to Chart A below.

The symbols "Me" and "Et" are intended to represent a methyl and an ethyl group, respectively.

The starting material for the compounds having a 9-methyl group (I, R=H) is 6-methylpicolinic acid (II). This compound is converted to the saturated ester III by catalytic reduction and conventional esterification procedure. Treatment of the ester III with ethylene oxide results in the formation of the lactone IV. The lactone is reduced to the diol V by means of lithium aluminum hydride, the diol is converted to the dichloride VI with a reagent such as thionyl chloride, and the final products (I, R=H) are prepared by condensation of the dichloride with a primary amine. The products obtained as free bases are purified either by distillation or salt formation. The salts are formed conventionally, by dissolving the base in a solvent such as ethanol, acetone, or ether and passing in the salt-forming acid either directly or as a solution. The salt is then isolated and purified by recrystallization.

Among the nontoxic, pharmaceutically acceptable acid addition salts that may be formed are the hydrochloride, hydrobromide, sulfate, citrate, maleate, acetate, tartrate, and succinate.

An alternative method for the preparation of compounds of Formula I (R=H) comprises the treatment of the saturated ester III with an ethylenimine, preferably the acylated derivative, 1-p-nitrobenzoylethylenimine. The resulting product, ethyl 6-methyl-1-(2-p-nitrobenzamidoethyl)pipecolate, is hydrolyzed with acid to give the lactam VII. Reduction of the lactam with lithium aluminum hydride gives the secondary amine VIII, which is useful as an intermediate for the preparation of the final products of the invention. This amine is thus alkylated with a variety of alkyl halides to give the products I.

Among the primary amines which may be condensed with the dichloride VI are benzhydrylamine, benzylamine, 2 - dimethylaminoethylamine, 3 - dimethylaminopropylamine, 4-dipropylaminobutylamine, 3-dimethylamino-2-methylpropylamine, 2-diethylaminoethylamine, 2-piperidinoethylamine, 3-morpholinopropylamine, and 2-hexamethyleniminoethylamine.

Among the alkyl halides which may be used to alkylate the secondary amine VIII are 3-dimethylaminopropyl chloride, 2-diethylaminoethyl chloride, benzyl bromide, 2-piperidinoethyl chloride, and benzhydryl chloride.

The compounds of Formula I in which $R^1$ is 2-aminoethyl are prepared by treating the secondary amine VIII with 1-p-nitrobenzoylethylenimine. The resulting 2-p-nitrobenzamidoethyl product is then hydrolyzed with 6 N hydrochloric acid to give the 2-aminoethyl compound.

Compounds of Formula I in which $R^1$ is 2-guanidinoethyl are prepared by treating the 2-aminoethyl compound with either S-methylisothiourea sulfate, cyanamide, or with guanidine or its salts or derivatives.

Compounds of Formula I in which $R^1$ is guanyl are prepared by treating the secondary amine VIII with either S-methylisothiourea, cyanamide, or with guanidine or its salts or derivatives.

Compounds of Formula I in which R is hydroxy are prepared from pyridine-2,6-dicarboxylic acid. The acid groups are esterified and the pyridine ring catalytically reduced. This reduced diester is treated with 1-p-nitrobenzoylethylenimine to give the 1-(2-p-nitrobenzamidoethyl)piperidine diester. Hydrolysis of the amide and ester groups with 6 N hydrochloric acid results in simultaneous ring closure. This reaction is followed by esterification of the acid group to give the ester lactam IX. Reduction with lithium aluminum hydride yields the hydroxy amine

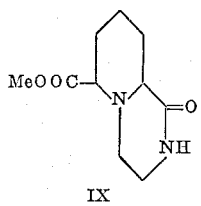

IX

VIII, in which R is OH. Compounds of formula VIII are then alkylated to give compounds of Formula I (R=OH).

The compounds of this invention may be administered orally or parenterally in conventional dosage forms such as tablets, capsules, injectables or the like, by combining an effective, but nontoxic dose of a compound with conventional carriers according to standard pharmaceutical practice. Dosages of 0.5–50 mg./kg. administered intravenously to cats are particularly effective in lowering blood pressure.

The following examples illustrate the preparation of the compounds of the invention, but are not to be construed as limiting the scope thereof. Modification may be made in the compounds and in the procedures for their preparation which are obvious to one skilled in the art of organic chemistry. Such obvious modifications are considered to be part of the present invention.

EXAMPLE 1

Ethyl 6-methylpipecolate 6-methylpicolinic acid (25.7 g., 0.188 mole) is dissolved in 50 ml. of conc. hydrochloric acid and 100 ml. of water. Platinum oxide (0.8 g.) is added and the mixture is hydrogenated at room temperature in a Parr shaker at forty-nine pounds per square inch pressure. When the theoretical amount of hydrogen (forty-six pounds) is absorbed (ca. five and one-half hours), the catalyst is removed by filtration and the filtrate evaporated to dryness in vacuo. The resulting salt decomposes at 245–255°. This salt is refluxed overnight in 150 ml. of absolute ethanol which has been saturated with dry hydrogen chloride. The solution is cooled, and the resultant precipitate filtered off. Evaporation of the filtrate yields an additional amount of product. When recrystallized from absolute ethanol, a sample of this salt decomposes at 232–234°.

Analysis.—Calcd. for $C_9H_{18}NO_2Cl$: N, 6.74%. Found: N, 6.36%.

The combined solids are dissolved in water, the solution is made basic with sodium carbonate and sodium hydroxide, and the basic aqueous solution thoroughly extracted with ether. The combined ether extracts are dried and evaporated to yield an oil. This oil is distilled at 89–91°/4 mm. to yield pure ester; $n_D^{25}$ 1.4510.

Analysis.—Calcd. for $C_9H_{17}NO_2$: C, 63.12; H, 10.01; N, 8.18%. Found: C, 62.98; H, 10.17; N, 8.21%.

EXAMPLE 2

Ethyl 6-methyl-1-(2-p-nitrobenzamidoethyl)pipecolate

Ethyl 6-methylpipecolate (5.0 g., .029 mole) is heated on the steam bath with 1-p-nitrobenzoylethylenimine [5.63 g., 0.029 mole, J. Am. Chem. Soc. 81, 2202 (1959)] for three hours. Upon heating, the mixture becomes a homogeneous liquid and turns a dark reddish color. After the reaction vessel is cooled, the oil is scratched with hexane until a brownish powder is produced, M.P. 62–69°. Recrystallization from petroleum ether-hexane yields the product, M.P. 79–81°. Two further recrystallizations produce an analytical sample, M.P. 76–78°.

Analysis.—Calcd. for $C_{18}H_{25}N_3O_5$: C, 59.49; H, 6.94; N, 11.56%. Found: C, 59.55; H, 7.11; N, 11.66%.

EXAMPLE 3

9-methyl-1,4-diazabicyclo[4.4.0]decan-5-one

Ethyl 6-methyl-1-(2-p-nitrobenzamidoethyl)pipecolate (11.5 g., 0.032 mole) is suspended in 100 ml. of 6 N hydrochloric acid, and the mixture is refluxed for twenty-four hours. The reaction vessel is cooled, and the resulting precipitate removed by filtration. The material weighs 5.7 g., melts at 235–242°, and is the by-product p-nitrobenzoic acid. The filtrate is evaporated to dryness, and the solid residue treated with isopropyl alcohol. Heating results in the formation of crystals of the hydrochloride of the product, which are removed by filtration. This material decomposes at 266°. An additional amount is obtained by evaporation of the isopropyl alcohol. A small sample is recrystallized from absolute alcohol for analysis.

Analysis.—Calcd. for $C_9H_{17}N_2OCl$: C, 52.80; H, 8.37%. Found: C, 52.52; H, 8.47%.

The hydrochloride is dissolved in water, the solution made basic with sodium carbonate and sodium hydroxide, and the basic solution extracted with chloroform. The chloroform extracts are dried and evaporated to yield solid plates that are recrystallized from ethyl acetate. The product melts at 124–127°.

Analysis.—Calcd. for $C_9H_{16}N_2O$: C, 64.25; H, 9.59; N, 16.65%. Found: C, 64.11; H, 9.65; N, 16.43%.

EXAMPLE 4

9-methyl-1,4-diazabicyclo[4.4.0]decane

A solution of 1.5 g. (.009 mole) of 9-methyl-1,4-diazabicyclo[4.4.0]decan-5-one in 15 ml. of tetrahydrofuran is added dropwise to a slurry of 0.57 g. (.015 mole) of lithium aluminum hydride in 20 ml. of tetrahydrofuran, and the mixture refluxed for twelve hours. The mixture is stirred at room temperature for an additional day, and the excess lithium aluminum hydride decomposed by the cautious addition of 2.5 ml. of water. Isopropyl alcohol is added, and the mixture stirred until it is uniformly white. The white solid is removed by filtration and thoroughly washed with isopropyl alcohol. The solvents are evaporated, and the resulting oil dissolved in ether. Dry hydrogen chloride is passed in, and the precipitated dihydrochloride salt removed by filtration. This compound is hygroscopic, and rapidly becomes sticky and dark. Crystals are reformed by subjecting the material to high vacuum, and the compound is twice recrystallized from isopropyl alcohol-acetone to produce an analytically pure dihydrochloride salt, M.P. 255–258° dec.

Analysis.—Calcd. for $C_9H_{20}N_2Cl_2$: C, 47.58; H, 8.87; N, 12.33; Cl, 31.21%. Found: C, 47.48; H, 8.93; N, 12.42; Cl, 30.97%.

A larger batch of product is prepared by adding a solution of 21.5 g. (.128 mole) of 9-methyl-1,4-diazabicyclo-[4.4.0]decan-5-one in 100 ml. of warm tetrahydrofuran to a slurry of 7.3 g. (.192 mole) of lithium aluminum hydride in 50 ml. of of tetrahydrofuran, and then refluxing for five hours. The reaction mixture is worked up as described above, and the isolated oil distilled at 66°/0.63 mm. to produce further product; $n_D^{25}$ 1.5006.

Analysis.—Calcd. for $C_9H_{18}N_2$: C, 70.07; H, 11.76; N, 18.17%. Found: C, 70.10; H, 11.75; N, 18.31%.

EXAMPLE 5

1-(2-hydroxyethyl)-6-methylpipecolic acid, δ-lactone

Ethyl 6-methylpipecolate (6.8 g., 0.04 mole) is dissolved in 25 ml. of methanol. To this solution is added a solution of 2.5 ml. (2.22 g., 0.05 mole) of liquid ethylene oxide in 10 ml. of methanol. The reaction mixture is allowed to sit on a steam bath in a pressure bottle for twenty-four hours. The solvent is evaporated in vacuo, and the resultant oil distilled at 125–130°/2 mm. The product is redistilled at 129–134°/2 mm. to yield a colorless liquid, $n_D^{25}$ 1.4894.

Analysis.—Calcd. for $C_9H_{15}NO_2$: C, 63.88; H, 8.94; N, 8.28%. Found: C, 63.81; H, 8.90; N, 8.14%.

EXAMPLE 6

2-hydroxymethyl-6-methylpiperidine

Ethyl 6-methylpipecolate hydrochloride (11 g., .05 mole) is added over a period of twenty minutes to a stirred suspension of 4.4 g. (0.116 mole) of lithium aluminum hydride in 150 ml. of anhydrous ether. After the addition is complete, the mixture is refluxed for twenty hours. The reaction mixture is cooled and 15 ml. of water are cautiously added to decompose the excess lithium aluminum hydride. The resulting white precipitate is removed by filtration and washed thoroughly with isopropyl alcohol. The filtrate and washings are combined and evaporated in vacuo to yield a waxy white solid, M.P. 62–70°. Two recrystallizations from petroleum ether yields the product, M.P. 83–83.5°.

Analysis.—Calcd. for $C_7H_{15}NO$: C, 65.07; H, 11.70; N, 10.84%. Found: C, 64.93; H, 11.53; N, 10.73%.

The preparation is also successfully carried out using the ester free base as the starting material.

EXAMPLE 7

1-(2-hydroxyethyl)-2-hydroxymethyl-6-methylpiperidine (a) By reduction of 1-(2-hydroxyethyl) - 6 - methylpipecolic acid, δ-lactone. A solution of 4.3 g. (.025 mole) of 1-(2-hydroxyethyl)-6-methylpipecolic acid, δ-lactone in 25 ml. of anhydrous ether is added slowly to a stirred suspension of 1.1 g. (.029 mole) of lithium aluminum hydride in 25 ml. of anhydrous ether. After the addition of 10 ml. more ether, the mixture is refluxed overnight. The mixture is cooled and the excess lithium aluminum hydride decomposed by cautious addition of 5 ml. of water. Isopropyl alcohol is added to facilitate the mixing. The resultant white precipitate is filtered off and washed well with isopropyl alcohol. Evaporation of the filtrate in vacuo yields an oil, which is distilled at 163°/12 mm.; $n_D^{25}$ 1.5000.

Analysis.—Calcd. for $C_9H_{19}NO_2$: C, 62.39; H, 11.05; N, 8.09%. Found: C, 62.14; H, 10.93, N, 8.18%.

(b) By hydroxyethylation of 2-hydroxymethyl-6-methylpiperidine. 2-hydroxymethyl-6-methylpiperidine (6.8 g., 0.053 mole) is dissolved in 25 ml. of methanol. To this solution is added a solution of 2.9 ml. (2.58 g., 0.059 mole) of liquid ethylene oxide in 15 ml. of methanol. The reaction mixture is allowed to sit on a steam bath in a pressure bottle with five drops of water for five days. The solvent is evaporated in vacuo and the liquid residue distilled. After a forerun consisting of starting material, the product distills at 164°/5 mm.; $n_D^{25}$ 1.5015.

EXAMPLE 8

1-(2-chloroethyl)-2-chloromethyl-6-methylpiperidine

A solution of 13.9 g. (0.08 mole) of 1-(2-hydroxyethyl)-2-hydroxymethyl-6-methylpiperidine in 50 ml. of chloroform is added dropwise over a forty-five minute period to a stirred solution of 14.4 ml. (23.8 g., 0.2 mole) of thionyl chloride in 50 ml. of chloroform. During this period evolution of heat and a darkening of the solution are observed. After gently refluxing for an additional two hours, the solvent is evaporated in vacuo, and the resulting black residue dissolved in water. The aqueous solution is made basic with sodium carbonate and then extracted with three 50 ml. portions of ether. Upon drying and evaporating the ethereal extracts, a crude dark oil is obtained. This oil is distilled at 127°/6 mm. to yield the product; $n_D^{25}$ 1.4997. The compound is redistilled for analysis.

Analysis.—Calcd. for $C_9H_{17}NCl_2$: C, 51.43; H, 8.16; N, 6.67; Cl, 33.74%. Found: C, 51.36; H, 8.11; N, 6.84; Cl, 33.99%.

EXAMPLE 9

4-benzyl-9-methyl-1,4-diazabicyclo[4.4.0]decane

A solution of 4.1 g. (.0383 mole) of benzylamine in 25 ml. of chloroform is added dropwise to a refluxing solution of 7.3 g. (.0348 mole) of 1-(2-chloroethyl)-2-chloromethyl-6-methylpiperidine and 7.0 g. (.0696 mole) of triethylamine in 50 ml. of chloroform. The solution is refluxed for one and one-half days and then allowed to stand at room temperature for one week. After the solvent is evaporated, water is added, and then sodium hydroxide to make the solution basic. The basic solution is extracted with chloroform, dried, and evaporated, leaving a crude black oil. This product is distilled at 158–162°/3 mm.

Analysis.—Calcd. for $C_{28}H_{30}N_8O_{14}$: C, 47.86; H, 4.30; N, 15.95%. Found: C, 48.01; H, 4.52; N, 15.61%.

EXAMPLE 10

4-(2-diethylaminoethyl)-9-methyl-1,4-diazabicyclo [4.4.0]decane

A solution of 2.75 g. (0.0239 mole) of 2-diethylaminoethylamine in 15 ml. of chloroform is added dropwise to a stirred refluxing solution of 5 g. (0.0239 mole) of 1-(2-chloroethyl)-2-chloromethyl-6-methylpiperidine and 4.8 g. (0.0477 mole) of triethylamine in 25 ml. of chloroform, and the solution is then refluxed for twenty-four hours. The solution is evaporated in vacuo, water is added, and the aqueous solution made basic with potassium hydroxide. The basic solution is extracted with chloroform, and the chloroform extracts are dried and evaporated to yield a dark oil. The residue is dissolved in absolute alcohol. Dry hydrogen chloride is added, followed by ether to precipitate a hygroscopic solid, M.P. 200–230° dec. An analytical sample is obtained by dissolving this material in methanol, followed by precipitation with acetone; M.P. 236–242° dec.

Analysis.—Calcd. for $C_{15}H_{34}N_3Cl_3$: C, 49.65; H, 9.45; N, 11.58; Cl, 29.32%. Found: C, 49.39; H, 9.73; N, 11.48; Cl, 29.26%.

The free base is regenerated by dissolving the hydrochloride in water, making the solution basic with sodium hydroxide, and extracting the basic solution with chloroform.

Analysis.—Calcd. for $C_{15}H_{31}N_3$: C, 71.09; H, 12.33; N, 16.58%. Found: C, 71.17; H, 12.51; N, 16.46%.

EXAMPLE 11

4-benzhydryl-9-methyl-1,4-diazabicyclo[4.4.0]decane

A solution of 4.35 g. (.0238 mole) of benzhydrylamine in 50 ml. of chloroform is added dropwise to a stirred refluxing solution of 5 g. (.0238 mole) of 1-(2-chloroethyl)-2-chloromethyl-6-methylpiperidine and 4.8 g. (.0477 mole) of triethylamine in 50 ml. of chloroform, and the reaction mixture refluxed for an additional four hours. The reaction mixture is cooled and a solution of dilute aqueous potassium hydroxide added. The layers are separated, the aqueous layer is further extracted with chloroform, and the combined chloroform extracts are dried and evaporated to yield the title product. The dihydrochloride salt is prepared by dissolving this compound in acetone and adding dry hydrogen chloride. Addition of petroleum ether or diethyl ether results in the dissolution of a gummy material. Solution of this gum in isopropyl alcohol and precipitation with acetone results in the formation of a hygroscopic material. This compound is then dissolved in methanol, ethyl acetate is added, and the mixture refluxed. Crystallization then occurs and the white solid is removed by filtration; M.P. 210–228° dec. This compound is recrystallized from methanol-ethyl acetate and decomposes at 228–229°.

*Analysis.*—Calcd. for $C_{22}H_{30}N_2Cl_2$: C, 67.17; H, 7.69; N, 7.12; Cl, 18.03%. Found: C, 67.32; H, 7.56; N, 7.32; Cl, 17.86%.

EXAMPLE 12

9-methyl-4-(2-piperidinoethyl)-1,4-diazabicyclo[4.4.0]decane

A solution of 3.05 g. (.0238 mole) of 2-piperidinoethylamine in 40 ml. of chloroform is added dropwise to a stirred refluxing solution of 5 g. (.0238 mole) of 1-(2-chloroethyl)-2-chloromethyl-6-methylpiperidine and 4.8 g. (.0477 mole) of triethylamine in 50 ml. of chloroform, and the solution is refluxed overnight. The reaction mixture is cooled, a dilute aqueous potassium hydroxide solution is added, and the two layers are separated. The aqueous layer is further extracted with chloroform, and the combined chloroform extracts are dried and evaporated to yield the product. The trihydrochloride salt is prepared by dissolving the oil in acetone and passing in dry hydrogen chloride. The acetone is evaporated, and the residue is twice recrystallized from methanol-ethanol-acetone to obtain an analytically pure salt, M.P. 301° dec.

*Analysis.*—Calcd. for $C_{16}H_{34}N_3Cl_3$: C, 51.27; H, 9.14; N, 11.21%. Found: C, 51.44; H, 9.27; N, 11.31%.

EXAMPLE 13

9-methyl-4-(2-p-nitrobenzamidoethyl)-1,4-diazabicyclo[4.4.0]decane

A solution of 3 g. (.0195 mole) of 9-methyl-1,4-diazabicyclo[4.4.0]decane and 3.74 g. (.0195 mole) of 1-p-nitrobenzoylethylenimine in 100 ml. of anhydrous acetone is refluxed for twenty-four hours. The solvent is evaporated in vacuo, and 7 g. of an oil is obtained. This oil solidifies upon addition of petroleum ether, and melts at 110–121°. Recrystallization from cyclohexane yields the product, M.P. 127–131°. Three further recrystallizations from cyclohexane produce an analytically pure sample, melting at 128.5–129.5°.

*Analysis.*—Calcd. for $C_{18}H_{26}N_4O_3$: C, 62.41; H, 7.57; N, 16.17%. Found: C, 62.42; H, 7.47; N, 16.09%.

EXAMPLE 14

4-(2-aminoethyl)-9-methyl-1,4-diazabicyclo[4.4.0]decane

A solution of 4-(2-p-nitrobenzamidoethyl)-9-methyl-1,4-diazabicyclo[4.4.0]decane in 50 ml. of 6 N hydrochloric acid is refluxed for two hours and the solution then allowed to cool. The precipitated p-nitrobenzoic acid is removed by filtration, the filtrate is made basic with sodium bicarbonate and sodium hydroxide, and the basic solution extracted with 4–50 ml. portions of chloroform. The chloroform extracts are dried and evaporated, and the residue distilled at 103–110°/0.43 mm.; $n_D^{20}$ 1.6807.

*Analysis.*—Calcd. for $C_{11}H_{23}N_3$: C, 66.96; H, 11.75; N, 21.30%. Found: C, 66.91; H, 11.55; N, 21.19%.

A portion of the base is dissolved in acetone and dry hydrogen chloride is passed in. The resulting solution is evaporated and the residue suspended in an isopropyl alcohol-ethanol mixture. Dry ether is added, precipitating a powder, M.P. 228–240° dec. Three recrystallizations from methanol-isopropyl alcohol yield a pure sample of the trihydrochloride salt, M.P. 265–268° dec.

*Analysis.*—Calcd. for $C_{11}H_{26}N_3Cl$: C, 43.07; H, 8.55; N, 13.70; Cl, 34.68%. Found: C, 43.05; H, 8.38; N, 13.62; Cl, 34.58%.

EXAMPLE 15

Dimethyl pyridine-2,6-dicarboxylate

A solution of 43 g. (.258 mole) of pyridine-2,6-dicarboxylic acid in 150 ml. of thionyl chloride is refluxed for one and one-half days. The solution is then evaporated at room temperature, leaving a solid residue. Methanol is added cautiously with cooling in order to control the strongly exothermic reaction. The reaction mixture is cooled, and the product is removed by filtration; M.P. 122–125°.

EXAMPLE 16

Dimethyl piperidine-2,6-dicarboxylate

Dimethyl pyridine-2,6-dicarboxylate (49.5 g., .254 mole) is dissolved in 250 ml. of warm glacial acetic acid. The solution is hydrogenated at forty-nine pounds per square inch pressure in the presence of 1.5 g. of platinum oxide. The hydrogen uptake over four and three-quarter hours is ca. 66 pounds (theoretical=62.5 pounds). During the reaction it may be necessary to reheat the pressure bottle to maintain the starting material in solution. The catalyst is removed by filtration and the filtrate evaporated in vacuo. The resulting oil is crystallized by the addition of acetone; M.P. 92–93°.

EXAMPLE 17

Dimethyl 1-(2-p-nitrobenzamidoethyl)piperidine-2,6-dicarboxylate

A solution of 3.23 g. (.0161 mole) of dimethyl piperidine-2,6-dicarboxylate and 3.08 g. (.0161 mole) of 1-p-nitrobenzoylethylenimine in 50 ml. of absolute alcohol is refluxed overnight. The solvent is evaporated in vacuo, benzene is added, a very small amount of insoluble material is filtered off, and the benzene solution extracted with dilute hydrochloric acid. The acid solution is made basic wtih sodium carbonate and the basic solution is then extracted with chloroform. The chloroform extracts are dried and evaporated to isolate crude product, M.P. 60–83°. The product is recrystallized from petroleum ether to get an analytical sample, M.P. 101–104°.

*Analysis.*—Calcd. for $C_{18}H_{23}N_3O_7$: C, 54.95; H, 5.89; N, 10.68%. Found: C, 54.91; H, 5.88; N, 10.45%.

EXAMPLE 18

5-oxo-1,4-diazabicyclo[4.4.0]decane-9-carboxylic acid

A solution of 3 g. (.0077 mole) of dimethyl 1-(2-p-nitrobenzamidoethyl)piperidine-2,6-dicarboxylate in 100 ml. of 6 N hydrochloric acid is refluxed for four hours and then cooled. The p-nitrobenzoic acid resulting from the hydrolysis is removed by filtration, the filtrate is extracted with 50 ml. of ether, and it is then evaporated to dryness. The residue is crystallized by the addition of acetone, resulting in the isolation of crystals of a hydrochloride salt, M.P. 268–271° dec. An analytical sample is obtained by heating with dimethylformamide and then cooling: M.P. 272–274° dec.

*Analysis.*—Calcd. for $C_9H_{15}N_2O_3Cl$: C, 46.06; H, 6.44; N, 11.94; Cl, 15.11%. Found: C, 46.05; H, 6.60; N, 11.72; Cl, 15.12%.

EXAMPLE 19

Methyl 5-oxo-1,4-diazabicyclo[4.4.0]decane-9-carboxylate

A suspension of 0.9 g. (.00455 mole) of 5-oxo-1,4-diazabicyclo[4.4.0]decane-9-carboxylic acid in 60 ml. of methanol is saturated with dry hydrogen chloride and refluxed overnight. The solution is evaporated in vacuo, the resulting oil dissolved in water, the aqueous solution is made basic with sodium carbonate and potassium hydroxide, and the basic solution extracted with chloroform. The chloroform extracts are dried and evaporated, leaving a white powder, M.P. 150–153°. A pure sample, melting at 155.5–156.5°, is obtained by recrystallization from benzenepetroleum ether.

*Analysis.*—Calcd. for $C_{10}H_{16}N_2O_3$: C, 56.68; H, 7.60; N, 13.20%. Found: C, 56.63; H, 7.72; N, 13.11%.

EXAMPLE 20

9-hydroxymethyl-1,4-diazabicyclo[4.4.0]decane

A solution of 15 g. (0.71 mole) of methyl 5-oxo-1,4-diazabicyclo[4.4.0]decane-9-carboxylate in 100 ml. of warm tetrahydrofuran is added dropwise to a suspension of 8.1 g. (.0212 mole) of lithium aluminum hydride in 50 ml. of tetrahydrofuran, and the mixture is refluxed for two days. The excess lithium aluminum hydride is decomposed by the cautious addition of 32 ml. of water and the mixture stirred until uniformly white. The white precipitate is filtered off and washed well with isopropyl alcohol, and the combined filtrates evaporated to leave a dark oil. The oil is distilled at 156–166°/2 mm.

EXAMPLE 21

4-(2-diethylaminoethyl)-9-hydroxymethyl-1,4-diazabicyclo[4.4.0]decane

A solution of 3.0 g. (0.176 mole) of 9-hydroxymethyl-1,4-diazabicyclo[4.4.0]decane in 50 ml. of acetone is added dropwise to a stirred solution of 2.79 g. (0.176 mole) of 2-diethylaminoethyl chloride hydrochloride and 3.55 g. (.0352 mole) of triethylamine in 50 ml. of water, and the solution is refluxed for twenty-four hours. The solution is evaporated to half volume, and dil. potassium hydroxide scolution is added until the solution is basic. The basic solution is extracted with chloroform and the chloroform extracts are dried and evaporated to give the product. The trihydrochloride is formed by dissolving the base in acetone and passing in dry hydrogen chloride. A pasty precipitate is formed. After decantation of the mother liquor, the precipitate is heated in isopropyl alcohol to form a white powder, M.P. 243–246° dec. Recrystallization from methanol-isopropyl alcohol affords pure trihydrochloride salt, M.P. 247–249° dec.

*Analysis.*—Calcd. for $C_{15}H_{34}N_3OCl_3$: C, 47.56; H, 9.05; N, 11.09; Cl, 28.08%. Found: C, 47.26; H, 9.02; N, 11.12; Cl, 27.74%.

EXAMPLE 22

9-hydroxymethyl-4-(2-piperidinoethyl)-1,4-diazabicyclo[4.4.0]decane

A solution of 3.0 g. (.0177 mole) of 9-hydroxymethyl-1,4-diazabicyclo[4.4.0]decane in 30 ml. of acetone is added dropwise to a solution of 3.25 g. (0.177 mole) of 1-(2-chloroethyl)piperidine hydrochloride and 3.55 g. (.0354 mole) of triethylamine in 50 ml. of water. The solution is refluxed for two hours and allowed to stir for one and one-half days at about 50° C. The solution is evaporated to half volume, sodium hydroxide pellets are added until the solution is strongly basic, and the basic solution is extracted with chloroform. The chloroform extracts are dried and evaporated to give the product. The trihydrochloride salt is prepared by dissolving the base in acetone and passing in dry hydrogen chloride. A hygroscopic precipitate forms. The mixture is evaporated and the residue is recrystallized from methanol-isopropyl alcohol to yield a white powder, M.P. 276–279° dec. A sample is recrystallized again from the same solvent combination; M.P. 277.5–279° dec.

*Analysis.*—Calcd. for $C_{16}H_{34}N_3OCl_3$: C, 49.17; H, 8.77; N, 10.75; Cl, 27.22%. Found: C, 48.98; H, 8.81; N, 10.57; Cl, 26.87%.

EXAMPLE 23

4-benzhydryl-9-hydroxymethyl-1,4-diazabicyclo[4.4.0]decane

A solution of 2.97 g. (.0147 mole) of benzhydryl chloride in 35 ml. of acetone is added dropwise to a stirred solution of 2.5 g. (.0147 mole) of 9-hydroxymethyl-1,4-diazabicyclo[4.4.0]decane and 1.48 g. (.0147 mole) of triethylamine in 50 ml. of acetone, and the reaction mixture refluxed overnight. The solvents are evaporated in vacuo to give an oil. A dilute aqueous solution of sodium hydroxide is added, and the insoluble oil is extracted with chloroform. The chloroform extracts are dried and evaporated, leaving an oil. The oil is dissolved in acetone and dry hydrogen chloride is bubbled through the solution. Evaporation yields a partly crystalline gel, which is converted entirely to crystals by dissolving the gel in methanol and evaporating to give the hydrochloride salt. Two recrystallizations from methanol-ethyl acetate yield the dihydrochloride. The free base is prepared by dissolving a small amount of the salt in water and making the solution basic with sodium hydroxide. The resulting white solid is filtered off, M.P. 153–154° dec.

*Analysis.*—Calcd. for $C_{22}H_{28}N_2O$: C, 78.53; H, 8.39; N, 8.33%. Found: C, 78.46; H, 8.32; N, 8.14%.

EXAMPLE 24

4-(2-guanidinoethyl)-9-methyl-1,4-diazabicyclo[4.4.0]decane

To a solution of 5.0 g. of 4-(2-aminoethyl)-9-methyl-1,4-diazabicyclo[4.4.0]decane in absolute ethanol is added 3.5 g. of S-methylisothiourea sulfate and the mixture refluxed until the evolution of methyl mercaptan ceases. The solution is evaporated in vacuo, the residue dissolved in water, aqueous sodium hydroxide is added, and the aqueous layer extracted with ether. The ether extracts are dried and evaporated to give the title product.

EXAMPLE 25

4-guanyl-9-hydroxymethyl-1,4-diazabicyclo[4.4.0]decane

To a solution of 4.3 g. of 9-hydroxymethyl-1,4-diazabicyclo[4.4.0]decane in absolute ethanol is added 3.5 g. of S-methylisothiourea sulfate. The reaction is carried out and worked up as in Example 24 to give the title product.

We claim:
1. A compound selected from the group consisting of a compound of the structure

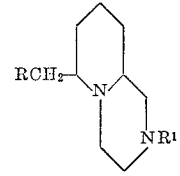

and a pharmaceutically acceptable acid addition salt thereof, wherein:

R is hydrogen or hydroxy; and
$R^1$ is benzyl, benzhydryl, dilower alkylamino lower alkyl, amino lower alkyl, piperidino lower alkyl, pyrrolidino lower alkyl, 4-methylpiperazino lower alkyl, morpholino lower alkyl, hexamethylenimino lower alkyl, guanidino lower alkyl, or guanyl.

2. A compound as in claim 1, in which R is hydrogen.
3. A compound as in claim 1, in which R is hydroxy.
4. 4 - (2 - guanidinoethyl) - 9 - methyl - 1,4 - diazabicyclo[4.4.0]decane.
5. 4 - guanyl - 9 - hydroxymethyl - 1,4 - diazabicyclo[4.4.0]decane.
6. 4 - benzhydryl - 9 - methyl - 1,4 - diazabicyclo[4.4.0]decane.
7. 4 - benzhydryl - 9 - hydroxymethyl - 1,4 - diazabicyclo[4.4.0]decane.
8. 4 - (2 - aminoethyl) - 9 - methyl - 1,4 - diazabicyclo[4.4.0]decane.
9. 4 - (2 - diethylaminoethyl) - 9 - hydroxymethyl - 1,4-diazabicyclo[4.4.0]decane.
10. 9 - hydroxymethyl - 4 - (2 - piperidinoethyl) - 1,4-diazabicyclo[4.4.0]decane.

No references cited.

HENRY R. JILES, *Primary Examiner.*